(12) United States Patent
Song et al.

(10) Patent No.: US 12,172,639 B2
(45) Date of Patent: Dec. 24, 2024

(54) SYSTEM AND METHOD OF INDUCING AND CONTROLLING COASTING OF VEHICLE

(71) Applicants: HYUNDAI MOTOR COMPANY, Seoul (KR); KIA CORPORATION, Seoul (KR)

(72) Inventors: Han Nah Song, Seoul (KR); Jee Wook Huh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 260 days.

(21) Appl. No.: 17/939,237

(22) Filed: Sep. 7, 2022

(65) Prior Publication Data
US 2023/0081570 A1    Mar. 16, 2023

(30) Foreign Application Priority Data
Sep. 14, 2021    (KR) .......................... 10-2021-0122277

(51) Int. Cl.
*B60W 30/18*    (2012.01)
*B60W 10/04*    (2006.01)

(52) U.S. Cl.
CPC ...... *B60W 30/18072* (2013.01); *B60W 10/04* (2013.01); *B60W 2540/10* (2013.01); *B60W 2540/12* (2013.01); *B60W 2554/802* (2020.02); *B60W 2556/45* (2020.02)

(58) Field of Classification Search
CPC .......... B60W 30/18072; B60W 10/04; B60W 2556/45; B60W 2554/802; B60W 2540/10; B60W 2540/12
See application file for complete search history.

(56) References Cited

U.S. PATENT DOCUMENTS

2023/0068356 A1*    3/2023    Aggoune ........... G01C 21/3492

\* cited by examiner

*Primary Examiner* — Michael D Lang
(74) *Attorney, Agent, or Firm* — MCDONNELL BOEHNEN HULBERT & BERGHOFF LLP

(57) ABSTRACT

A system and method of inducing and controlling coasting of a vehicle are able to prevent unnecessary acceleration and deceleration, improve fuel efficiency, and prevent a safety accident of a driver and pedestrians by dividing a preset distance from a vehicle to a signal lamp into four or more sections on the basis of road signal information, etc., and by performing deceleration induction, deceleration control, acceleration induction, coasting induction, creep torque control in coasting, etc. for sections, respectively, based on information of a vehicle speed, a signal lamp, etc.

18 Claims, 5 Drawing Sheets

- INTERVAL FOR WHICH GREEN LIGHT CHANGES TO RED LIGHT -

- INTERVAL FOR WHICH RED LIGHT CHANGES TO GREEN LIGHT -

SYSTEM AND METHOD OF INDUCING AND CONTROLLING COASTING OF VEHICLE

CROSS REFERENCE TO RELATED APPLICATIONS

The present application claims priority to Korean Patent Application No. 10-2021-0122277, filed on Sep. 14, 2021, the entire contents of which is incorporated herein for all purposes by this reference.

BACKGROUND

Field

The present disclosure relates to a system and method of inducing and controlling coasting of a vehicle and, more particularly, to a control system and method that can actively control induction of acceleration/deceleration and coasting of a vehicle.

Description of the Related Art

Road information that can be used while a vehicle is driven is classified into static information and dynamic information in a broad meaning. The static information, for example, may be the gradient and curvature of a road, a toll gate, etc., and the dynamic information, for example, may be signal lamp information or road signal information such as a congestion signal that can be obtained through vehicle-to-everything (V2X) communication that is communication between the subjective vehicle and another information medium.

At present, individual vehicles can collect the road signal information, etc. through V2X communication, but the collected road signal information is only referred to as data for safe driving of a vehicle and is not specifically processed or used for direct control of driving of a vehicle.

Accordingly, drivers manually control the speed of a vehicle in accordance with the point in time of turning-on/off of signal lamps and frequently accelerate and decelerate in congestion areas with many signal lamps, congestion becomes severe and fuel efficiency decreases. Further, when a driver rapidly accelerates by estimating a signal change, a safety accident of the driver and pedestrians may occur.

SUMMARY

The present disclosure has been made in an effort to solve the problems and an objective of the present disclosure is to provide a system and method of inducing and controlling coasting of a vehicle, the system and method being able to prevent unnecessary acceleration and deceleration, improve fuel efficiency, and prevent a safety accident of a driver and pedestrians by dividing a preset distance from a vehicle to a signal lamp into four or more sections on the basis of road signal information, etc., and by performing deceleration induction, deceleration control, acceleration induction, coasting induction, creep torque control in coasting, etc. for sections, respectively on the basis of information of a vehicle speed, a signal lamp, etc.

In order to achieve the objectives of the present disclosure, an embodiment of the present disclosure provides a system for inducing and controlling coasting of a vehicle, the system including a telematics server configured to provide road signal information and road gradient information, a communication device configured to receive and transmit the road signal information and the road gradient information from the telematics server to a main controller, and the main controller configured to determine which section of a plurality of sections, which divides a preset distance between a vehicle and a signal lamp, the vehicle is positioned in and then to perform a function of inducing and controlling coasting in a different way for each determined section, when it is a term until the signal lamp changes into a red light from a green light or it is a term until the signal lamp changes into the green light from the red light on the basis of the road signal information.

In order to achieve the objectives of the present disclosure, another embodiment of the present disclosure provides a method of inducing and controlling coasting of a vehicle, the method including determining whether to activate a function of inducing and controlling coasting of a vehicle by means of a main controller, determining which section of a plurality of sections, which divides a preset distance between the vehicle and a signal lamp, the vehicle is positioned in, by means of the main controller, when the function of inducing and controlling coasting of a vehicle is activated and it is a term until the signal lamp changes into a red light from a green light or it is a term until the signal lamp changes into the green light from the red light on the basis of road signal information provided from a telematics server, and performing a function of inducing and controlling coasting in a different way for each determined section by means of the main controller.

The present disclosure provides the following effects through the objectives described above.

According to the present disclosure, it is possible to prevent unnecessary acceleration and deceleration, improve fuel efficiency, and prevent a safety accident of a driver and pedestrians by dividing a preset distance from a vehicle to a signal lamp into four or more sections on the basis of road signal information, vehicle speed information, etc., and by performing deceleration induction, deceleration control, acceleration induction, coasting induction, creep torque control in coasting, etc. for control sections, respectively, on the basis of information of a vehicle speed, a signal lamp, etc.

BRIEF DESCRIPTION OF THE FIGURES

The above and other objectives, features and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

Figure 1:
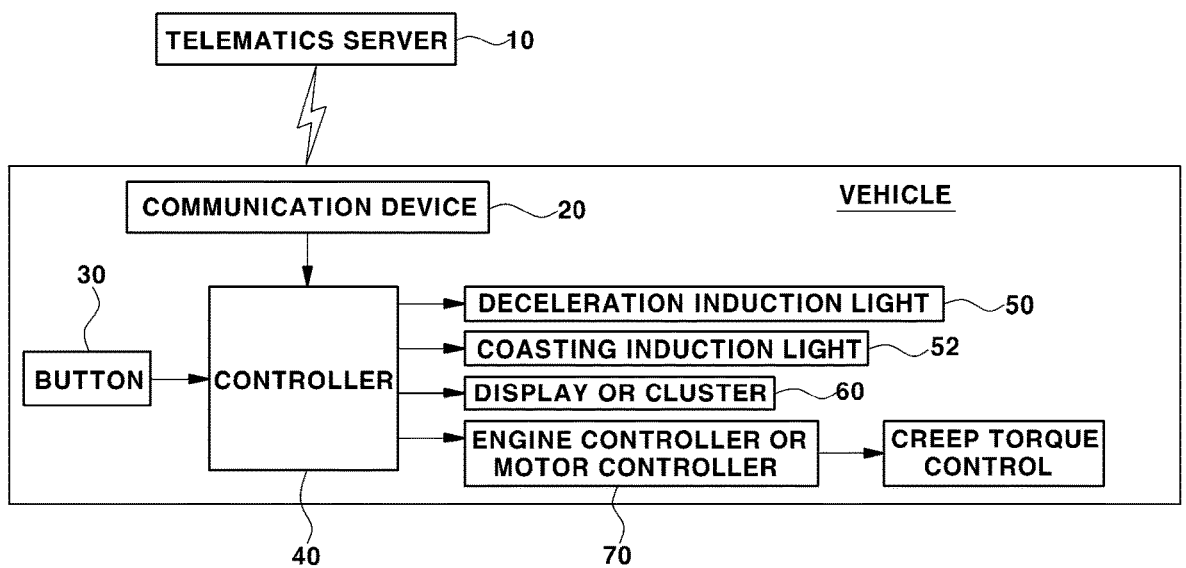
FIG. 1 is a diagram showing the configuration of a system and method of inducing and controlling coasting of a vehicle according to the present disclosure.

FIG. 1 is a diagram showing the configuration of a system and method of inducing and controlling coasting of a vehicle according to the present disclosure.

It is possible to road gradient information, etc. in addition to road traffic information including signal lamp information, distance information between a vehicle and a signal lamp, and congestion information through V2X that is communication with another information medium while the vehicle is driven.

To this end, with a telematics server 10 of a telematics service center and a communication device 20 of a vehicle connected such that communication is possible, the communication device 20 receives road gradient information, etc. in addition to road traffic information including signal lamp information, distance information between a vehicle and a signal lamp, and congestion information from the server 10 and transmits the information to a main controller 40.

A system for inducing and controlling coasting of a vehicle according to the present disclosure includes a telematics server 10 that provides road signal information and road gradient information, a communication device 20 that receives road signal information and road gradient information from the server 10 and transmits the information to the main controller 40, and a button 30 that is provided around a driver seat to activate the function of inducing and controlling coasting.

In particular, the main controller 40 is configured to determine which one of a plurality of sections dividing a preset distance between a vehicle and a signal lamp the vehicle is positioned at, and then to perform the function of inducing and controlling coasting in different ways for predetermined sections when it is a term until a signal lamp changes into the red light from the green light or is a term until the signal lamp changes into the green light from the red light on the basis of the road signal information.

The system for inducing and controlling coasting of a vehicle of the present disclosure further includes an engine controller or a motor controller 70 that controls creep torque of a vehicle in accordance with an instruction from the main controller 40, a deceleration induction light 50 that is disposed at a cluster 60 to be turned on indirect deceleration induction control is performed by the main controller 40, and a coasting induction light 52 that is disposed at the cluster 60 to be turned on when indirect deceleration control or coasting control is performed by the main controller 40.

The function of inducing and controlling coasting of a vehicle according to the present disclosure may be activated or inactivated, depending on a preset distance between a vehicle and signal lamp and the driving state of a vehicle.

To this end, when a driver presses and turns on a button 30 installed around a driver seat in a vehicle to control coasting or selects and turns on a menu button 30 displayed on a display to control coasting, the main controller 40 determines whether to activate the function of inducing and controlling coasting of a vehicle in accordance with a preset distance between the vehicle and a signal lamp and the driving state of the vehicle.

The main controller 40 inactivates the function of inducing and controlling coasting when the depression amount of an accelerator pedal or a brake pedal is maintained at a reference level or higher for a predetermined time or more, or when the distance between a vehicle and a signal lamp exceeds a preset distance, or when the distance from a forward vehicle is a predetermined distance or less, or when another driving safety device has been activated.

For reference, another driving safety device, for example, may be Autonomous Emergency Braking (AEB) system that stops or decelerates a vehicle in accordance with its determination when a driver cannot actively decelerate due to carelessness or an unexpected obstacle, a Smart Cruise Control (SCC) system that assists a driver to drive at a set speed without operating an accelerator pedal, etc.

However, the main controller 40 activates the function of inducing and controlling coasting of a vehicle when the depression amount of an accelerator pedal or a brake pedal is less than a reference level, the distance between a vehicle and a signal lamp is a predetermined distance or less, the distance from a forward vehicle exceeds a preset distance, and another driving safety device has been activated.

The preset distance between a vehicle and a signal lamp may be divided for sections including first to seventh sections and stored in the main controller 40 in accordance with signal lamp information.

Figure 2:
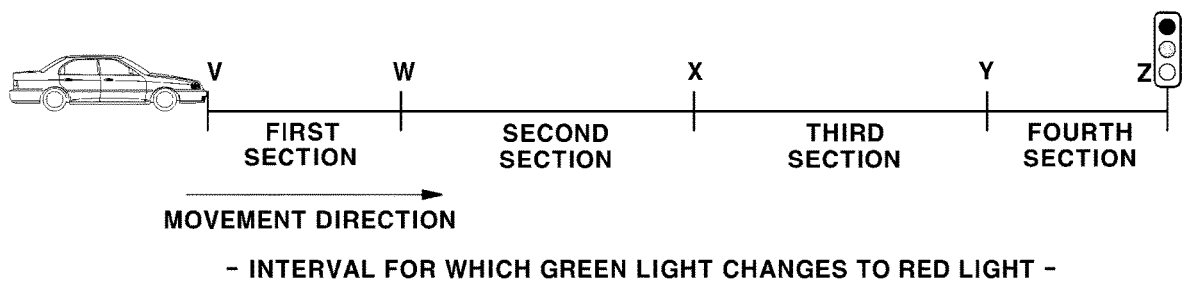
FIGS. 2 and 3 are schematic views showing an example in which a preset distance between a vehicle and a signal lamp is divided into four or more sections to induce and control coasting of a vehicle according to the present disclosure.

Referring to FIG. 2, during the time interval when the signal lamp changes into the red light from the green light, the preset distance between a vehicle and the signal lamp may be divided into a first section (the distance from a point V to a point W) in which the distance between the vehicle and the signal lamp is the longest and indirect deceleration induction control or direct deceleration control is performed, a second section (the distance from the point W to a point X) in which acceleration induction control is performed, a third section (the distance from the point X to a point Y) in which indirect coasting induction control or direct coasting control is performed, a fourth section (the distance from the point Y to a point Z where the signal lamp is) in which there is no specific driving instruction or guidance, etc.

Figure 3:
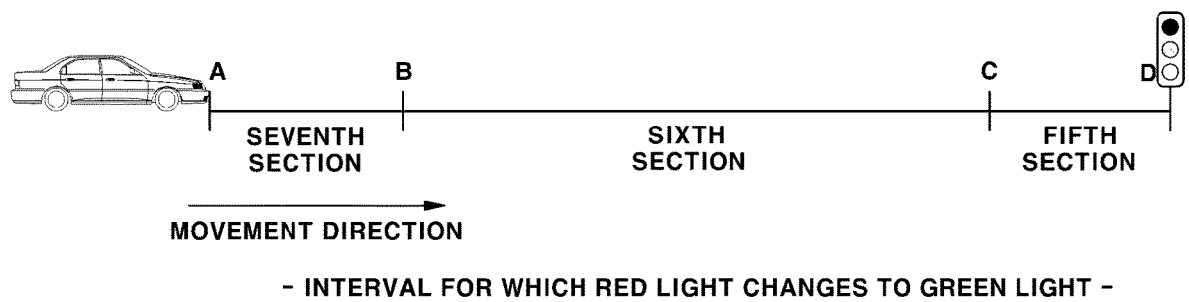

Referring to FIG. 3, during the time interval when the signal lamp changes into the green light from the red light, the preset distance between a vehicle and the signal lamp may be divided into a seventh section (the distance from a point A to a point B) in which the distance between the vehicle and the signal lamp is the longest and there is no specific driving control and guidance as in the fourth section, a sixth section (the distance from a point B to a point C) in which indirect coasting induction control or direct coasting control is performed, as in the third section, a fifth section (the distance from the point C to a point D where the signal lamp is) in which indirect deceleration induction control or direct deceleration control is performed, as in the first section, etc.

The distances of the first to seventh sections dividing the preset distance between the vehicle and the signal lamp may be reset in accordance with traffic amount information, information of the distance from a forward vehicle, and road gradient information.

For example, during the time interval when the signal changes into the red light from the green light and the traffic based on traffic amount information is congested, the distances of the first section (the distance from the point V to the point W) and the fourth section (the distance from the point Y to the point Z where the signal lamp is) may be reset to be decreased and the distances of the second section (the distance from the point W to the point X) and the third section (the distance from the point X to the point Y) may be reset to be increased. Further, when the distance from a forward vehicle decrease to a predetermined distance or less, the distances of the second, third, and fourth sections may be reset to be decreased and the distance of the first section may be reset to be increased.

During the time interval when the signal lamp changes into the red light from the green light and the average gradient based on the road gradient information from the vehicle to the signal lamp shows a downhill slope, the distance of the second section may be reset to be decreased and the distance of the third and fourth sections may be reset to be increased. Further, when the average gradient shows an uphill slope, the distance of the second section may be reset to be increased and the distances of the third and fourth sections may be reset to be decreased.

On the other hand, during the time interval when the signal lamp changes into the green light from the red light and the traffic based on traffic information is congested, the distance of the sixth section (the distance from the point B to the point C) may be reset to be decreased and the distances of the fifth section (the distance from the point C to the point D) and the seventh section (the distance from the point A to the point B) may be reset to be increased. Further, when the distance from a forward vehicle decreases to a predetermined distance or less, the distances of the sixth and seventh sections may be reset to be decreased and the distance of the fifth section may be reset to be increased.

During the time interval when the signal lamp changes into the green light from the red light and the average gradient based on the road gradient information from the vehicle to the signal lamp shows a downhill slope, the distances of the sixth and seventh sections may be reset to be increased. Further, when the average gradient shows an uphill slope, the distance of the fifth section may be reset to be increased and the distances of the sixth and seventh sections may be reset to be decreased.

As described above, the distances of the first to seventh sections dividing the preset distance between the vehicle and the signal lamp may be reset in accordance with traffic amount information, information of the distance from a forward vehicle, and road gradient information.

During the time interval when the signal lamp changes into the red light from the green light based on the road signal information, the main controller 40 determines which section of the first to fourth sections the vehicle is positioned in by multiplying the current speed of the vehicle by the remaining time of the signal lamp (the remaining time until the green light changes to the red light).

Alternatively, during the time interval when the signal lamp changes into the green light from the red light based on the road signal information, the main controller 40 determines which section of the fifth to seventh sections the vehicle is positioned in by multiplying the current speed of the vehicle by the remaining time of the signal lamp (the remaining time until the red light changes to the green light).

After determining which section of the first to seventh sections the vehicle is currently positioned in, the main controller 40 performs driving control in a different way for each determined section to pass the signal lamp.

For example, when the main controller 40 determines that the vehicle is currently positioned in the first section (the distance from the point V to the point W) or the fifth section (the distance from the point C to the point D where the signal lamp is), indirect deceleration induction control or direct deceleration control may be performed.

The indirect deceleration induction control is for inducing deceleration to prevent excessive acceleration and rapid stop when it is impossible to pass a corresponding signal lamp, and may be made by control of turning on the deceleration induction light 50 that may be installed at a cluster or control of displaying the degree of ideal deceleration through a graph or numbers on the display or the cluster 60 by means of the main controller 40.

The indirect deceleration control may be made by control of turning on the coasting induction light 52 that may be installed at the cluster to prevent rapid stop by means of the main controller 40 and control of changing the current engine torque or motor torque for driving of the vehicle such that the absolute value of creep torque increases from default creep torque without an accelerator pedal depressed by means of the engine controller of the motor controller 70 in accordance with an instruction from the main controller 40, when it is not possible to pass a corresponding signal lamp.

The creep torque is a force that is opposite to the movement direction of a vehicle and acts in deceleration, and the maximum creep torque may be zero (0).

As another example, when the main controller 40 determines that the vehicle is currently positioned in the second section (the distance from the point W to the point X), acceleration induction control may be performed.

The acceleration induction control may be made by control of displaying the degree of acceleration or a target vehicle speed for passing a corresponding signal lamp through a graph or numbers on the display or cluster 60 by means of the main controller 40 in order to improve the traffic flow when it is possible to pass the signal lamp.

As another example, when the main controller 40 determines that the vehicle is currently positioned in the third section (the distance from the point X to the point Y) or the sixth section (the distance from the point B to the point C), indirect coasting induction control or direct coasting control may be performed.

The indirect coasting induction control, which is control of informing a driver that it is possible to pass a signal lamp in a coasting state without unnecessary accelerating, that is, depressing the accelerator pedal, may be made by control of turning on the coasting induction light 52 that may be installed at the cluster by means of the main controller 40 and control of displaying information that lets the driver knows that it is currently possible to pass a signal lamp through coasting on the display or the cluster 60 by means of the main controller 40.

Since it is possible to pass a signal lamp in a coasting state without a driver unnecessarily accelerating, that is, depressing an accelerator pedal, the indirect coasting control may be made by control of turning on the coasting induction light 52 that may be installed at the cluster by means of the main controller 40 to prevent excessive acceleration and efficiently pass the signal lamp and control of changing the current engine torque or motor torque for driving of the vehicle such that the absolute value of creep torque decreases from the default creep torque during coasting by means of the engine controller or the motor controller 70 in accordance with an instruction from the main controller 40.

As another example, when the main controller 40 determines that the vehicle is currently positioned in the fourth section (the distance from the point Y to the point Z where the signal lamp is) or the seventh section (the distance from the point A to the point B), frequently informing causes fatigue to the driver and it is determined that the driver can visually sufficiently determine whether it is possible to pass the signal lamp, so specific driving control or guidance control is not performed.

The method of inducing and controlling coasting of a vehicle according to the present disclosure is described in more detail hereafter.

Figure 4:
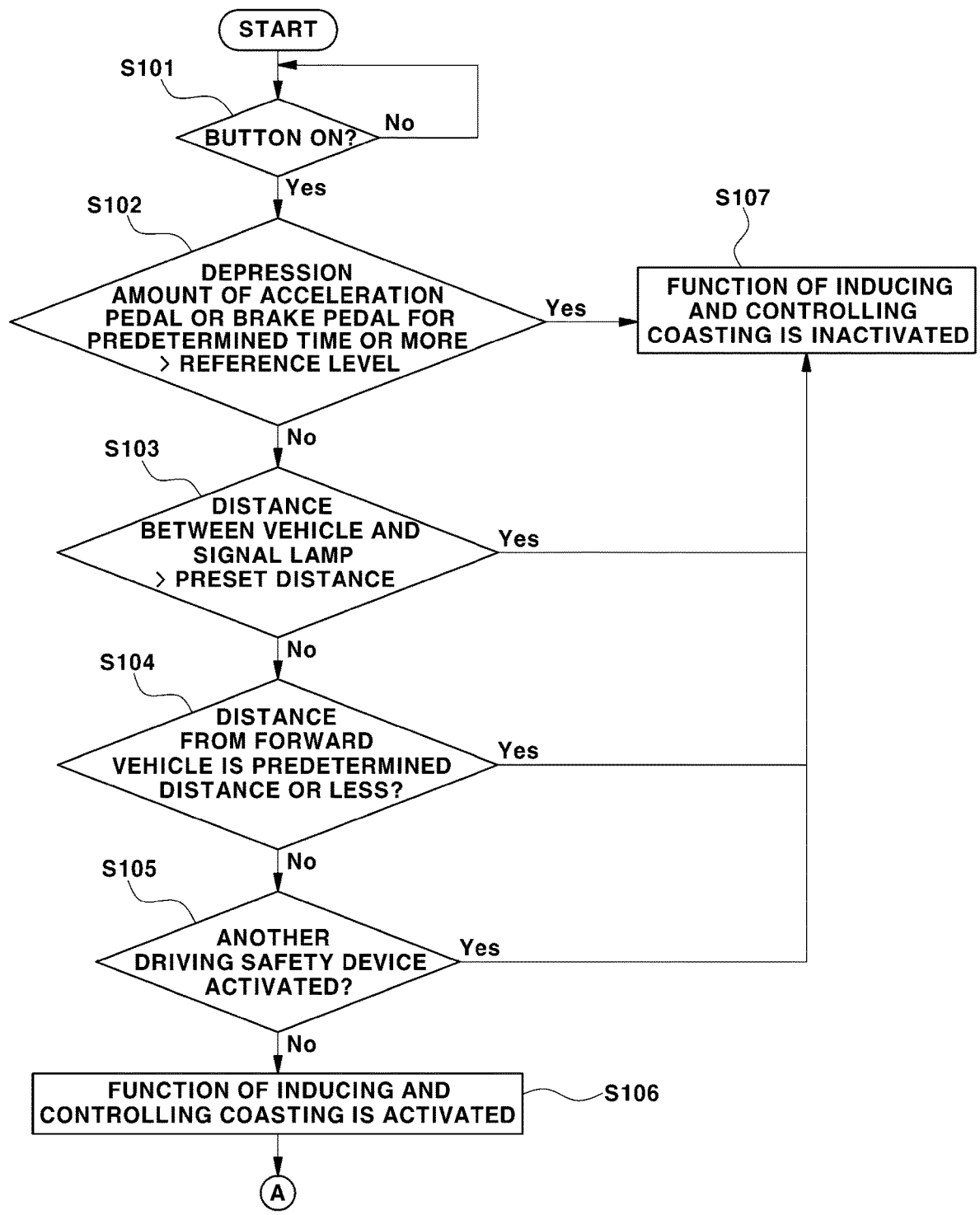
FIG. 4 is a flowchart showing an example of determining whether to activate the function of inducing and controlling coasting of a vehicle according to the present disclosure.
Figure 5:
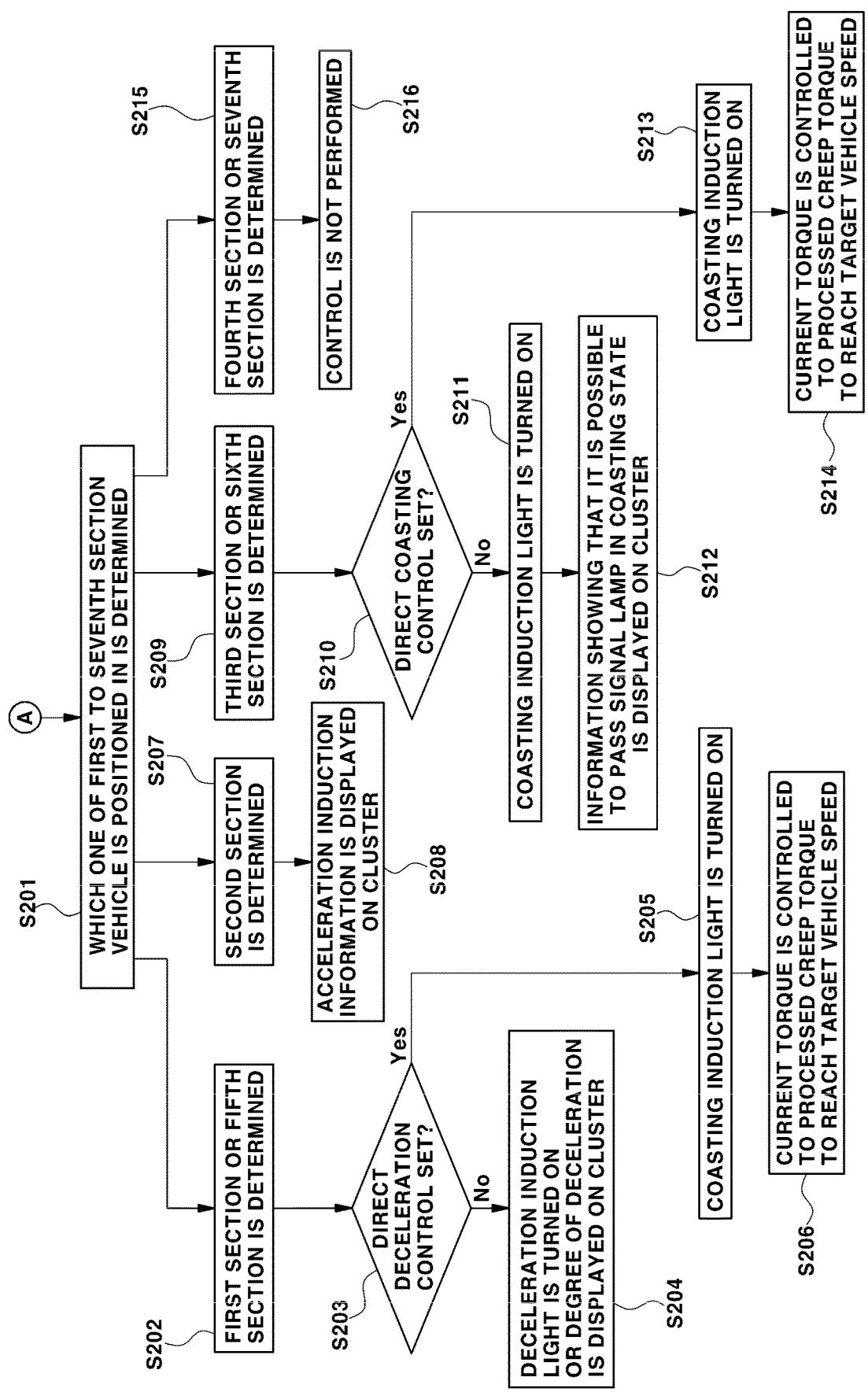
FIG. 5 is a flowchart showing an example in which the method of inducing and guiding coasting of a vehicle according to the present disclosure is performed in a different way for each section of a preset distance between a vehicle and a signal lamp.

FIG. 4 is a flowchart showing an example of determining whether to activate the function of inducing and controlling coasting of a vehicle according to the present disclosure and FIG. 5 is a flowchart showing an example in which the method of inducing and controlling coasting of a vehicle according to the present disclosure is performed in a different way for each section of a preset distance between a vehicle and a signal lamp.

First, the main controller 40 checks whether the button 30 installed around a driver seat in a vehicle to control coasting is pressed or the menu button 30 displayed on a display to control coasting is selected at S101.

Next, the main controller 40 determines whether to activate the function of inducing and controlling coasting of a vehicle and whether to directly intervene in control in accordance with a preset distance between a vehicle and a signal lamp and the driving state of the vehicle.

To this end, the main controller 40 checks whether the depression amount of an accelerator pedal or a brake pedal has been maintained at a reference level or higher for a predetermined time or more, whether the distance between the vehicle and the signal lamp exceeds a preset distance, whether the distance from a forward vehicle is a predetermined distance or less, and whether another driving safety device has been activated, etc. (S102-S105).

However, as the results of steps S102-S105, when the depression amount of an accelerator pedal or a brake pedal is less than a reference level, the distance between a vehicle and a signal lamp is a predetermined distance or less, the distance from a forward vehicle exceeds a preset distance, and another driving safety device has been activated, the main controller 40 activates the function of inducing and controlling coasting of a vehicle at S106.

However, as the results of steps S102-S105, when the depression amount of an accelerator pedal or a brake pedal is maintained at a reference level or higher for a predetermined time or more, the distance between the vehicle and the signal lamp exceeds a preset distance, the distance from a forward vehicle is a predetermined distance or less, or another driving safety device has been activated, the main controller 40 inactivates the function of inducing and controlling coasting at S107.

Next, the main controller 40 receives road gradient information in addition to road signal information including signal lamp information, the information of the distance between the vehicle and the signal lamp, congestion information, etc. through the communication device 20 from the server 10 of the telematics service center, and determines which section of the first to seventh sections the vehicle is positioned in at S201.

During the time interval when the signal lamp changes into the red light from the green light based on the signal lamp information, the main controller 40 determines which section of the first to fourth sections the vehicle is positioned in by multiplying the current speed of the vehicle by the remaining time of the signal lamp (the remaining time until the green light changes to the red light).

Alternatively, during the time interval when the signal lamp changes into the green light from the red light based on the road signal information, the main controller 40 determines which section of the fifth to seventh sections the vehicle is positioned in by multiplying the current speed of the vehicle by the remaining time of the signal lamp (the remaining time until the red light changes to the green light).

After determining which section of the first to seventh sections the vehicle is currently positioned in, the main controller 40 performs driving control in a different way for each determined section to pass the signal lamp.

As the determination result of step S201, during the time interval when the signal lamp changes into the red light from the green light, it may be determined that the vehicle is positioned in the first section (the distance from the point V to the point W), or during the time interval when the signal lamp changes into the green light from the red light, it may be determined that the vehicle is positioned in the fifth section (the distance from the point C to the point D where the signal lamp is).

During the time interval when the signal lamp changes into the red light from the green light and it is determined that the vehicle is positioned in the first section (the distance from the point V to the point W) that is farthest from the signal lamp, indirect deceleration induction control or direct deceleration control is performed because the signal lamp may change soon to the red light.

During the time interval when the signal lamp changes into the green light from the red light and it is determined that the vehicle is positioned in the fifth section (the distance from the point C to the point D where the signal lamp is) that is closest to the signal lamp, indirect deceleration induction control or direct deceleration control is performed, as in the first section, because the signal lamp is currently the red light.

As described above, when the main controller 40 determines that the vehicle is currently positioned in the first section (the distance from the point V to the point W) or the fifth section (the distance from the point C to the point D where the signal lamp is), indirect deceleration induction control or direct deceleration control may be performed.

In this case, the driver can select one of the indirect deceleration induction control and the direct deceleration control by operating a corresponding menu displayed on the display.

Accordingly, the main controller 40 determines by itself whether the vehicle has been set in the indirect deceleration induction control or the direct deceleration control (S203) and then performs one of the indirect deceleration induction control and the direct deceleration control.

The indirect deceleration induction control by the main controller 40 is for inducing deceleration to prevent excessive acceleration and rapid stop when a vehicle cannot pass a signal lamp, and is made by control of turning on the deceleration induction light 50 that may be installed at the cluster or control of displaying the ideal degree of deceleration through a graph or numbers on the display or the cluster 60 (S204).

Accordingly, it is possible to induce the driver to decelerate such as operating the brake pedal through turning-on of the deceleration induction light 50 or the deceleration information displayed on the cluster 60.

On the other hand, the direct deceleration control by the main controller 40 is for preventing rapid stop when it is impossible to pass a corresponding signal lamp, and includes: a step of performing control of turning on the coasting induction light 52 that may be installed at the cluster by means of the main controller 40 at S205, and a deceleration control step of gradually reducing the current engine torque or the motor torque for driving of the vehicle to the creep torque for coasting without the accelerator pedal depressed by means of the engine controller or the motor controller 70 in accordance with an instruction from the main controller 40 at S206.

The deceleration control step of step S206 may control the current torque to the creep torque processed to reach a target vehicle speed.

Accordingly, the deceleration control of turning on the coasting induction light 52 and gradually reducing the current torque to the creep torque is automatically performed, whereby it is possible to prevent rapid stop even without intervention of the driver.

Figure 6:
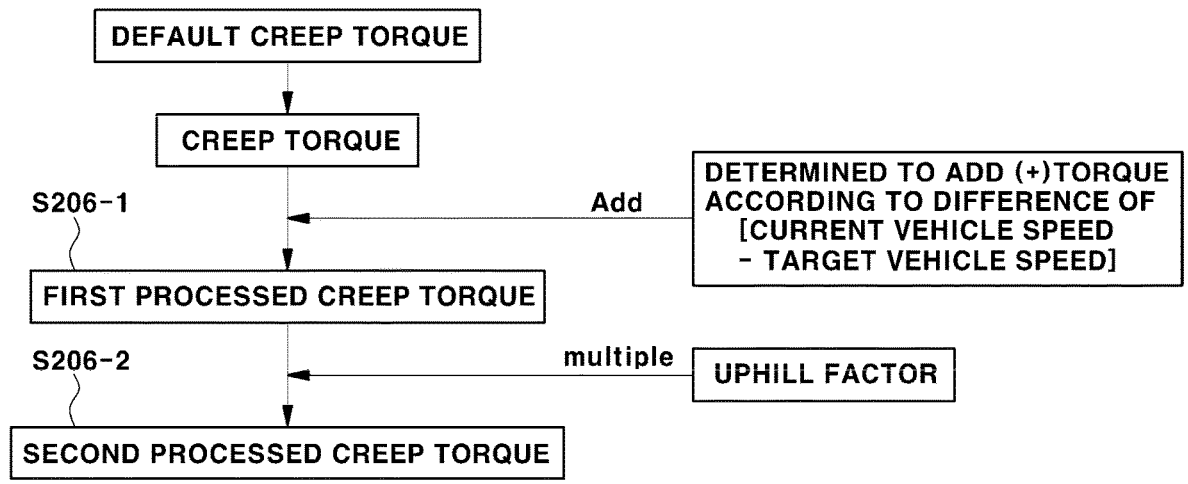
FIG. 6 is a flowchart showing a method of determining creep torque when a vehicle is positioned in a first section or a fifth section as the method of inducing and controlling coasting of a vehicle according to the present disclosure.

When the position of the vehicle is in the first section (the distance from the point V to the point W) that is the farthest from a signal lamp, the vehicle may be stopped due to the direct deceleration control. Accordingly, in order to prevent this situation, a control step of generating first processed creep torque by adding (+) torque determined in accordance with the difference between the current vehicle speed and a preset target vehicle speed to the creep torque at S206-1 may be further performed in accordance with an instruction from the main controller 40, as shown in the flowchart of FIG. 6. Further, a control step of generating second processed creep torque by multiplying the first processed creep torque by an uphill factor when the first section is an uphill slope at S206-2 may be further performed.

When it is determined that the position of the vehicle is in the fifth section (the distance from the point C to the point D where a signal lamp is) that is the closest to the signal lamp, the current signal lamp may change into the green light from the red light, so the control step of generating first processed creep torque by adding (+) torque determined in accordance with the difference between the current vehicle speed and a preset target vehicle speed to the creep torque at S206-1 may be further performed in accordance with an instruction from the main controller 40, as shown in the flowchart of FIG. 6, in order to increase the driving torque for passing the signal lamp. Further, the control step of generating second processed creep torque by multiplying the first processed creep torque by an uphill factor when the first section is an uphill slope at S206-2 may be further performed.

During the time interval when the signal lamp changes into the red light from the green light, as the result of step S201, it may be determined that the vehicle is positioned in the second section (the distance from the point W to the point X) (S207).

During the time interval when the signal lamp changes into the red light from the green light and it is determined that the vehicle is positioned in the second section (the distance from the point W to the point X), acceleration induction control may be performed by the main controller 40.

The acceleration induction control may be made by control of displaying the degree of acceleration or a target vehicle speed for passing a signal lamp as acceleration induction information through a graph or numbers on the display or cluster 60 by means of the main controller 40 in order to improve the traffic flow when it is possible to pass the signal lamp at S208.

As the determination result of step S201, when it is the term until the signal lamp changes into the red light from the green light, it may be determined that the vehicle is positioned in the third section (the distance from the point X to the point Y), or when it is the term until the signal lamp changes into the green light from the red light, it may be determined that the vehicle is positioned in the sixth section (the distance from the point B to the point C).

During the time interval when the signal lamp changes into the red light from the green light and it is determined that the vehicle is positioned in the third section (the distance from the point X to the point Y), indirect coasting induction control or direct coasting control is performed.

During the time interval when the signal lamp changes into the green light from the red light and it is determined that the vehicle is positioned in the sixth section (the distance from the point B to the point C), indirect coasting induction control or direct coasting control is performed.

In this case, the driver can select one of the indirect coasting induction control and the direct coasting control by operating a corresponding menu displayed on the display.

Accordingly, the main controller 40 determines by itself whether the vehicle has been set in the indirect coasting induction control or the direct coasting control at S210 and then performs one of the indirect coasting induction control and the direct coasting control.

The indirect coasting induction control, which is control of informing a driver that it is possible to pass a signal lamp through coasting without unnecessary accelerating, that is, depressing the accelerator pedal, may be composed of a control step of turning on the coasting induction light 52 that may be installed at the cluster by means of the main controller 40 at S211 and a control step of displaying information that lets the driver knows that it is currently possible to pass a signal lamp through coasting on the display or the cluster 60 by means of the main controller 40 at S212.

Accordingly, it is possible to induce coasting in which a vehicle can pass a signal lamp even without a driver depressing the accelerator pedal and to prevent unnecessary acceleration before passing a signal lamp by turning on the coasting induction light 52 or displaying the information on the cluster 60.

Since the direct coasting control makes it possible to pass a signal lamp in a coasting state without a driver unnecessarily accelerating, that is, depressing the accelerator pedal, the direct coasting control is torque control of artificially reducing the driving torque to prevent excessive acceleration and safely passing a signal lamp and may be composed of a control step of turning on the coasting induction light 52 that may be installed at the cluster by means of the main controller 40 at S213 and a step of controlling the vehicle speed by adding reduced creep torque to the current engine torque or motor torque for driving of the vehicle by means of the engine controller or the motor controller 70 in accordance with an instruction from the main controller 40 at S214.

Accordingly, the current engine torque or motor torque for driving of the vehicle is reduced to appropriate torque for coasting through the direct coasting control, whereby it is possible to pass a signal lamp in a coasting state and it is possible to stably drive and keep pedestrians safe by preventing acceleration before passing a signal lamp.

Figure 7:
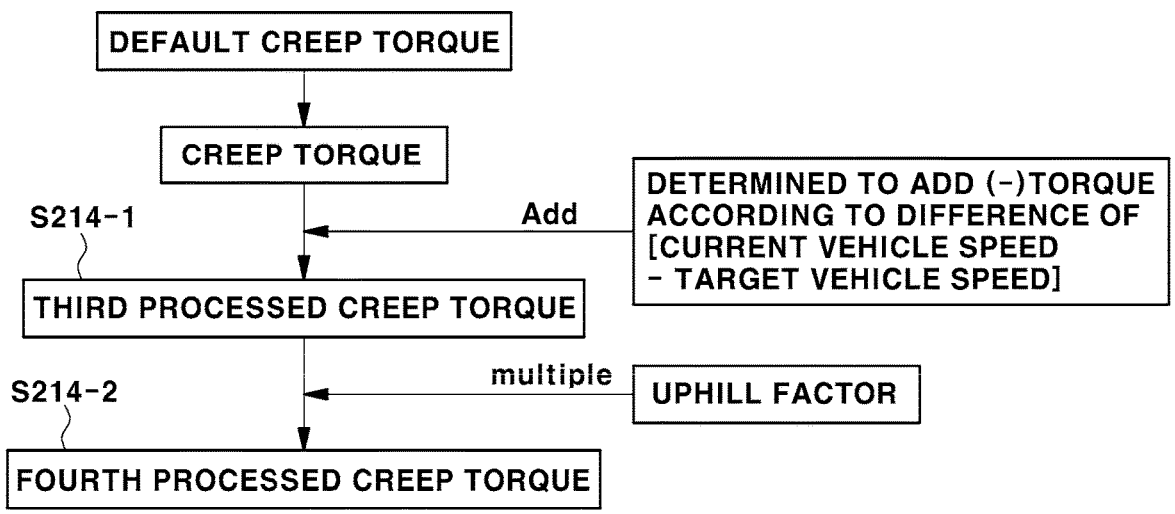
FIG. 7 is a flowchart showing a method of determining creep torque when a vehicle is positioned in a third section or a sixth section as the method of inducing and controlling coasting of a vehicle according to the present disclosure.

In the direct coasting control, for the current torque (the current engine torque or motor torque for driving of a vehicle), a control step of generating third processed creep torque by adding (−) torque determined in accordance with the difference between the current vehicle speed and a preset target vehicle speed to initially set default creep torque at S214-1 is further performed, as shown in the flowchart of FIG. 7. Accordingly, it is possible to reduce the current torque to non-excessive creep torque, thereby being able to prevent acceleration before passing a signal lamp and safely pass a signal lamp.

The driving torque is reduced to be smaller than the existing creep torque such that the absolute value of the creep torque, which acts opposite to the driving torque, decreases through the direct coasting control, so a user does not feel excessive acceleration, whereby it is possible to prevent the driver from accelerating again.

Control of generating fourth processed creep torque by multiplying the first processed creep torque by an uphill factor when the third section or the sixth section is an uphill slope is further performed, whereby it is possible to easily drive on an uphill slope.

As the determination result of step S201, when it is the term until the signal lamp changes into the red light from the green light, it may be determined that the vehicle is positioned in the fourth section (the distance from the point Y to the point Z where the signal lamp is) that is closest to the signal lamp, or when it is the term until the signal lamp changes into the green light from the red light, it may be determined that the vehicle is positioned in the seventh section (the distance from the point A to the point B) at S215.

When it is the term until the signal lamp changes into the red light from the green light and it is determined that the vehicle is positioned in the fourth section (the distance from the position Y to the position Z where the signal lamp is) that is closest to the signal lamp, it is possible to pass the signal lamp. Accordingly, frequent informing causes fatigue to the driver and the driver visually determines that it is possible to pass the signal lamp well, so specific driving control and guidance control is not performed at S216.

Similarly, when it is the term until the signal lamp changes into the green light from the red light and it is determined that the vehicle is positioned in the seventh section (the distance from the point A to the point B) that is farthest from the signal lamp, the signal lamp has changed already into the green light and it is possible to pass the signal lamp when the vehicle comes closest to the signal lamp. Accordingly, frequent informing causes fatigue to the driver and the driver visually determines that it is possible to pass the signal lamp well, so specific driving control and guidance control is not performed at S216.

Although the present disclosure was described above in detail through one embodiment, the scope of the present disclosure is not limited to the embodiment, and various changes and modifications by those skilled in the art using the spirit of the present disclosure defined in the following claims are also included in the scope of the present disclosure.

The invention claimed is:

1. A system for inducing and controlling coasting of a vehicle, the system comprising:
a telematics server configured to provide road signal information; and
a communication device configured to receive and transmit the road signal information from the telematics server to a main controller;
wherein the main controller is configured to determine which section of a plurality of sections, which divide a preset distance between a vehicle and a signal lamp, the vehicle is positioned in, and then to perform a function of inducing and controlling coasting in a different way for each determined section, during a time interval when the signal lamp changes into a red light from a green light, or during a time interval when the signal lamp changes into the green light from the red light based on the road signal information;
wherein the main controller is configured to divide a preset distance between the vehicle and a signal lamp into a first section in which indirect deceleration induction control or direct deceleration control is performed, a second section in which acceleration induction control is performed, a third section in which indirect coasting induction control or direct coasting control is performed, and a fourth section in which there is no specific driving control or guidance, during the time interval when the signal lamp changes into a red light from a green light;
wherein the main controller is configured to divide a preset distance between the vehicle and a signal lamp into a seventh section in which there is no specific driving control or guidance, a sixth section in which indirect coasting induction control or direct coasting control is performed, and a fifth section in which indirect deceleration induction control or direct deceleration control is performed, during the time interval when the signal changes into a green light from a red light; and
wherein the main controller is configured to adjust the absolute value of creep torque based on the section in which the vehicle is positioned.

2. The system of claim 1, further comprising:
a button, provided around a driver seat, for activating the function of inducing and controlling coasting;
an engine controller or a motor controller configured to control creep torque of the vehicle in accordance with an instruction from the main controller;
a deceleration induction light positioned at a cluster to be turned on when indirect deceleration induction control is performed by the main controller; and
a coasting induction light positioned at the cluster to be turned on when direct deceleration control or coasting control is performed by the main controller.

3. The system of claim 2, wherein the main controller is configured to inactivate the function of inducing and controlling coasting when a depression amount of an accelerator pedal or a brake pedal is maintained at a reference level or higher for a predetermined time or more, or a distance between the vehicle and a signal lamp exceeds a preset distance, or a distance from a forward vehicle is a predetermined distance or less, or another driving safety device has been activated, with the button turned on.

4. The system of claim 2, wherein the main controller is configured to activate the function of inducing and controlling coasting when a depression amount of an accelerator pedal or a brake pedal is less than a reference level, a distance between the vehicle and a signal lamp is a preset distance or less, a distance from a forward vehicle exceeds a predetermined distance, and another driving safety device has been activated, with the button turned on.

5. The system of claim 1, wherein the indirect deceleration induction control by the main controller is made by control of turning on a deceleration induction light installed at a cluster or control of displaying an ideal degree of deceleration through a graph or numbers on a display or the cluster.

6. The system of claim 1, wherein the indirect deceleration control by the main controller is made by control of turning on a coasting induction light installed at a cluster and control of changing current engine torque or motor torque for driving of the vehicle such that an absolute value of creep torque increases from default creep torque by means of an engine controller or a motor controller in accordance with an instruction from the main controller.

7. The system of claim 1, wherein the acceleration induction control by the main controller is made by control of displaying a degree of acceleration or a target vehicle speed for passing a signal lamp through a graph or numbers on a display or a cluster.

8. The system of claim 1, wherein the indirect coasting induction control by the main controller is made by control of turning on a coasting induction light installed at a cluster and control of displaying information, which shows that it is possible to pass a signal lamp in a coasting state on a display or a cluster.

9. The system of claim 1, wherein the direct coasting control by the main controller is made by control of turning on a coasting induction light installed at a cluster and control of changing current engine torque or motor torque for driving of the vehicle such that an absolute value of creep torque decreases from default creep torque by means of an engine controller or a motor controller in accordance with an instruction from the main controller.

10. A method of inducing and controlling coasting of a vehicle, the method comprising:
   determining whether to activate a function of inducing and controlling coasting of a vehicle by a main controller;
   determining which section of a plurality of sections, which divide a preset distance between the vehicle and a signal lamp, the vehicle is positioned in, by the main controller, when the function of inducing and controlling coasting of a vehicle is activated and during a time interval when the signal lamp changes into a red light from a green light or during a time interval when the signal lamp changes into the green light from the red light based on road signal information provided from a telematics server; and
   performing a function of inducing and controlling coasting in a different way for each determined section by the main controller;
   wherein the main controller divides a preset distance between the vehicle and a signal lamp into a first section in which indirect deceleration induction control or direct deceleration control is performed, a second section in which acceleration induction control is performed, a third section in which indirect coasting induction control or direct coasting control is performed, and a fourth section in which there is no specific driving control or guidance, and determines which one of the first to fourth section the vehicle is positioned in, during the time interval when the signal lamp changes into a red light from a green light;
   wherein the main controller divides a preset distance between the vehicle and a signal lamp into a seventh section in which there is no specific driving control or guidance, a sixth section in which indirect coasting induction control or direct coasting control is performed, and a fifth section in which indirect deceleration induction control or direct deceleration control is performed, and determines which one of the fifth to seventh sections the vehicle is positioned in, during the time interval when the signal changes into a green light from a red light; and
   wherein the main controller is configured to adjust the absolute value of creep torque based on the section in which the vehicle is positioned.

11. The method of claim 10, wherein the function of inducing and controlling coasting by the main controller is activated when a depression amount of an accelerator pedal or a brake pedal is less than a reference level, a distance between the vehicle and a signal lamp is a preset distance or less, a distance from a forward vehicle exceeds a predetermined distance, and another driving safety device has been activated.

12. The method of claim 11, wherein the acceleration induction control by the main controller is made by displaying a degree of acceleration or a target vehicle speed for passing a signal lamp through a graph or numbers on a display or a cluster.

13. The method of claim 11, wherein the indirect coasting induction control by the main controller is made by turning on a coasting induction light installed at a cluster and control of displaying information, which shows that it is possible to pass a signal lamp in a coasting state, on a display or a cluster.

14. The method of claim 11, wherein the direct coasting control by the main controller is made by turning on a coasting induction light installed at a cluster and changing current engine torque or motor torque for driving of the vehicle such that an absolute value of creep torque decreases from default creep torque by means of an engine controller or a motor controller in accordance with an instruction from the main controller.

15. The method of claim 14, further comprising performing a control step of generating third processed creep torque by adding torque determined in accordance with a difference between a current vehicle speed and a preset target speed to the creep torque, and a control step of generating fourth processed creep torque by multiplying the first processed creep torque by an uphill factor when the third section or the sixth section is an uphill slope.

16. The method of claim 10, wherein the indirect deceleration induction control by the main controller is made by turning on a deceleration induction light installed at a cluster or control of displaying an ideal degree of deceleration through a graph or numbers on a display or the cluster.

17. The method of claim 10, wherein the indirect deceleration control by the main controller is made by turning on a coasting induction light installed at a cluster and changing current engine torque or motor torque for driving of the vehicle such that an absolute value of creep torque increases from default creep torque by means of an engine controller or a motor controller in accordance with an instruction from the main controller.

18. The method of claim 17, further comprising performing a control step of generating first processed creep torque by adding torque determined in accordance with a difference between a current vehicle speed and a preset target speed to the creep torque, and performing a control step of generating second processed creep torque by multiplying the first processed creep torque by an uphill factor when the first section and the fifth section are uphill slopes.

* * * * *